United States Patent [19]
Avramenko et al.

[11] 3,957,511

[45] May 18, 1976

[54] METHOD FOR PRODUCING A VISIBLE IMAGE BY USE OF A PHOTOCONDUCTOR

[76] Inventors: Rimily Fedorovich Avramenko, Baltiiskaya ultisa 4, kv. 46; Gurgen Ashotovich Askarian, Rozhdestvensky bulvar, 19, kv. 4, both of Moscow, U.S.S.R.

[22] Filed: July 30, 1974

[21] Appl. No.: 493,643

[30] Foreign Application Priority Data
July 31, 1973  U.S.S.R. .............................. 1949311

[52] U.S. Cl. ...................................... 96/1 E; 204/2; 204/18 PC; 346/76 R; 346/74 E; 250/335
[51] Int. Cl.² ............................................ G03G 13/22
[58] Field of Search .................. 96/1 R, 1 E; 204/2, 204/18 PC; 346/74 EL, 76 R; 250/335

[56] References Cited
UNITED STATES PATENTS

| | | | |
|---|---|---|---|
| 1,617,397 | 2/1927 | Knipp | 250/335 |
| 2,798,959 | 7/1957 | Moncrieff-Yeates | 96/1 E |
| 2,997,430 | 8/1961 | Foyn | 204/151 |
| 3,010,883 | 11/1961 | Johnson et al. | 204/2 X |
| 3,194,748 | 7/1965 | Urbach | 204/2 X |
| 3,233,104 | 2/1966 | Heffan | 250/335 |
| 3,393,617 | 7/1968 | Gaynor | 96/1 E |
| 3,402,111 | 9/1968 | Ville | 204/18 PC |
| 3,439,174 | 4/1969 | Snaper | 204/2 X |
| 3,479,281 | 11/1969 | Kikindai et al. | 204/149 X |
| 3,718,913 | 2/1973 | Maloney et al. | 346/74 EL |

*Primary Examiner*—Roland E. Martin, Jr.
*Attorney, Agent, or Firm*—Holman & Stern

[57] ABSTRACT

A method for producing a visible image with the help of a photoconductor under the action of irradiation which carries the image and causes the appearance of current and charges in the medium wherein the photoconductor is disposed, and which renders the image visible under the action of current and charges when illuminated. Said medium contains components selected from the group comprising a solution of an electrolyte, a gasified liquid, a liquid that approaches the condition of boiling, a saturated, and a supersaturated vapour, and creates phase nuclei in response to the passage of current and charges in direct proximity to the surface of the photoconductor. The phase nuclei concentrate in the areas corresponding to the areas of higher irradiation of the photoconductor, thus reproducing the image.

17 Claims, No Drawings

METHOD FOR PRODUCING A VISIBLE IMAGE BY USE OF A PHOTOCONDUCTOR

BACKGROUND OF THE INVENTION

The present invention relates to optoelectronics and more specifically to the art of producing a visible image with the aid of a photoconductor under the action of image carrying radiation. The invention can be used for producing bright images of static and dynamic processes and objects in infravision, television, projection and duplicating technique.

Photoconductors have gained widespread application in modern optoelectronics for reproduction, registration and the holding of images in photocopy technology and in photoelectroluminescent methods.

Methods for producing visible images with the aid of a photoconductor under the action of irradiation carrying the image and causing the appearance of current and charges in the photoconductor and the medium accomodating the photoconductor, and which medium, under the action of current and charges, is adapted to render the image visible when illuminated.

The medium which is adapted to render the image visible under the action of current and charges used in the above-described prior art methods is an electrolyte which is a solution of blue vitriol, or salts of silver, which solution deposits image reproducing metal on the surface of a photoconductor in response to the passage of a current and charges therethrough. All this results in low sensitivity, requires further development and causes difficulties experienced in registering the rapidly changing images with time created by the irradiation, which is a direct result of low dissipation of the developing light by the thin metal layer deposited on the photoconductor during the insignificantly small period of time during which the image is exposed. Due to the impossibility of using high density current, a rapid change also occurs for developing the surfaces of the image frames.

SUMMARY OF THE INVENTION

An object of the present invention is to provide a method for the production of a visible image, the method being capable of a rapid multiple reproduction at a high image sensitivity that change with time, by means of a photoconductor and under the action of image-carrying radiation.

The object is achieved in a method for producing a visible image by means of a photoconductor under the action of image-carrying radiation and causing the appearance of currents and charges in the photoconductor and the medium in which it is disposed and which, under the action of current and charges, is capable of rendering an image visible when illuminated, wherein according to the invention, the medium which is capable of rendering an image visible under the action of current and charges is represented by a medium containing a solution of electrolyte, or a gasified liquid, or a liquid which is in the state of near-boiling, or a saturated or oversaturated vapour, and creating, under the conditions of the passage of current, or charges on, or near the surface of the photoconductor, phase nuclei, namely vapour-gas nuclei (bubbles) in the electrolyte and the liquid and condensed nuclei (droplets) in the vapour, and concentrated in localities that correspond to the localities where the photoconductor is irradiated more, thus reproducing the image.

Such image reproducing phase nuclei can be grown by creating metastable conditions in the medium which is capable of rendering the image visible under the action of a current and charges, with the metastable conditions ensuring spontaneous growth of the nuclei.

The image-reproducing phase nuclei are advantageously removed by means of increasing the pressure to a value which ensures the bursting and dissolution of the vapour-gas nuclei and evaporation of condensed nuclei.

The phase nuclei are advantageously removed by shaking or scraping.

The phase nuclei are also advantageously removed by heating.

In order to reduce image distortion at the moment the phase nuclei are illuminated, voltage is preferably removed from the photoconductor.

A layer of anisotropic conducting medium, bordering on the one side of the photoconductor, and on the other side of the medium which, under the action of current and charges, renders the image visible, is preferably provided between the photoconductor and the medium which renders the image visible under the action of current and charges.

When using saturated and supersaturated vapour as the medium which renders the image visible under the action of current and charges, an additional pulsed electric field is preferably provided to draw the charges from the surface of the photoconductor, or from the surface of the anisotropic conducting medium, to the medium that renders the image visible under the action of current and charges, thus facilitating the illumination of the nuclei.

The method according to the present invention is highly effective since phase nuclei require little energy for initiating the formation, but highly effectively dissipate the developing light used for illuminating the nuclei that form the image. Calculations prove that the number of dissipated quanta that can be obtained from dissipating a luminous flux of medium density on vapour-gas phase nuclei, or on condensed phase nuclei, is millions of times greater than the number of quanta that were used for creating these phase nuclei. The growing of nuclei makes this ratio still larger (the amplification ratio K is about $a^2/a^2{}_1$, wherein a is the size of grown nucleus; $a_1$ is the initial size of the nucleus). Such a large amplification ratio is extremely desirable when registering low intensity images, or with a low efficiency of reception.

The present invention will now be explained in greater detail by describing the method for producing visible images with reference to the preferred embodiments thereof.

The method for producing a visible image in accordance with the present invention comprises producing a visible image with the help of a photoconductor under the action of an image-carrying radiation which causes the appearance of current and charges in the photoconductor and the medium wherein the latter is disposed, and which is adapted to render the image visible under illumination under the action of current and charges. The function of the medium which will render an image visible under the action of current and charges is performed by a medium containing a solution of electrolyte, or a gasified liquid, or a liquid that is in the state of near-boiling, or a saturated or supersaturated vapour, which liquid creating phase nuclei in response to the passage of current, or charges on or near the surface of the photoconductor, with the phase nuclei being vapour gas nuclei in the electrolyte or the liquid, and condensed nuclei in the vapour, and concentrated at areas that correspond to the areas of greater irradiation of the photoconductor which thus reproduce the image.

In order to simplify the further description we shall hereinafter term the medium that produces an image under the action of current and charges as the image producing medium, Further, two more terms will be introduced, namely, the primary image and the secondary image. The primary image is understood to be the image carried by the radiation, whereas the secondary image is the image that is visible on or near the photoconductor surface when illuminated.

The electrolyte solutions used in the method according to the present invention are aqueous solutions of inorganic acids and alkali, at employed a concentration in the range of from 0.1 to 100 weight percent such as sulfuric acid, hydrochloric acid, hydrates of sodium and potassium oxides.

In addition to that, alkali metal salts as well as mixtures of aqueous solutions of inorganic acids and salts can be used as the electrolyte. The specific electrolyte is selected in combination with the photoconductor that will not hinder its performance when in contact with the electrolyte. In this case the photoconductor is preferably made of such photoconducting materials as silicon, germanium, gallium arsenide, selenium or, cadmium selenide. The photoconductive materials can be used in their pure form, and also after treatment to change their surface photoconductivity. The gasified liquid used in the present invention can be any of the above-identified electrolytes rendered gasified by dissolving a gas therein which is neutral relative to the specific electrolyte used under pressure: for example, carbon dioxide in an aqueous solution of sulfuric or hydrochloric acid. However, other gases, such as nitrogen, oxygen or, inert gases, possessing low solubility can also be used. The gasified liquid can be alcohol, propane and freon. Since many methods of gasifying liquids under pressure are widely known in the art, their description, being irrelevant to the subject of the present invention, is consequently omitted from the specification.

The liquid in the state of near-boiling, used in the method of the present invention, is water. Use can also be made of alcohol, ether, and liquified gases, such as propane and freon. The conditions of near-boiling of a given liquid are obtained by reducing the pressure from the atmospheric value to a reduced pressure in the range of from $\Delta p$ about $10^{-2} - 10$ atm., at normal temperatures, or with the initial atmospheric pressure, and temperature approaching the temperature of boiling, and then reducing the pressure to a low value.

The saturated and supersaturated vapour used in the method according to the present invention is a mixture of alcohol vapour in air, or a mixture of alcohol in argon. However, use can be made of other mixtures, such as ether vapour and a mixture of alcohol vapour with other inert gases.

When using a gas-saturated liquid, a liquid which is in the state of near boiling, a saturated or supersaturated vapour, the photoconductors employed are made of the same photoconductive materials that are employed when using an electrolyte.

In all the examples listed above, the radiation carrying the primary image and acting upon the photoconductor is a luminous radiation (visible, infra-red or ultra-violet light). However, use can be made of X-radiation, or any other ionizing radiation. As the radiation which is dissipated on the phase nuclei to render the image visible, light may be used.

The phase nuclei which reproduce an image obtained by the method described, permit the production of a bright image having a high resolving power. This characteristic is determined by the size of the nuclei produced which can easily be, when required, less than one micron.

The phase nuclei which reproduce an image, obtained by the method according to the present invention, are further grown by means of creating metastable conditions in the medium which will develop, under the action of current and charges, an image in the electrolyte, in a gas-saturated liquid, in a liquid which is in the state of near-boiling, and in a saturated or supersaturated vapour, all of which ensure spontaneous growth of nuclei, which increases their dissipation power and increases the brightness of the secondary image.

The metastable conditions ensuring spontaneous growth of nuclei are obtained in the case of vapour-gas phase nuclei by means of reducing the pressure from the initial value down to a fraction of atmospheric. The conditions are thus created for volumetric expansion of the vapour-gas nuclei. The increased volume results in the cooling of the gas and the creation of a metastable state. In order to create metastability which is sufficient for condensation on a unity ion to start, in the case of alcohol vapour in air, a volumetric expansion in the range of scores of percent from the starting volume is required. A considerably smaller value of the volumetric expansion is required for growing droplets from small-radius droplets, which is in the range of from 0.1 to 10 percent of the initial volume. Metastability can also be created by decreasing the temperature or by creating a temperature gradient, which owing to diffusion, produces a layer possessing metastability which is sufficient for bringing out the ions and growing the droplets.

Thus we have described one embodiment of the method according to the present invention for producing a visible image which permits a single image to be produced.

In order to reproduce images that change with time, either the same image or different images, the phase nuclei that reproduce the image by the above-described method are removed.

The phase nuclei are removed according to one embodiment of the method of the present invention, by increasing the pressure to a value which will ensure the bursting or dissolution of vapour-gas nuclei, and the evaporation of the condensed nuclei. For the liquid which formes the vapour-gas nuclei, this value must exceed the pressure of gas or vapour in the bubbles, whereas for saturated or supersaturated vapour which forms the condensed nuclei, the value must be equal to scores of percent of the initial pressure value.

After the phase nuclei are removed the process is repeated if a new image frame is required.

According to another embodiment of the method of the present invention, the phase nuclei are removed by shaking. Another embodiment of the method is also possible wherein the phase nuclei are removed by scraping. Both these embodiments are preferred when a pressure differential is not desirable, or when gas dissolution in the bubble is retarded due to low solubility or diffusion.

We have described various methods of removing phase nuclei which reproduce both vapor-gas and condensed nuclei.

However, in case the medium rendering the image visible is a saturated or supersaturated vapour, the phase condensed nuclei are removed, according to another embodiment of the present method, by means of the heating thereof to a temperature ensuring rapid evaporation of the nuclei. The object is achieved by heating the photoconductor, or by heating the nuclei themselves.

According to the present method, in order to avoid the clogging of the image by newly formed charges so to improve the quality of the image when the phase nuclei are illuminated, voltage is removed from the photoconductor.

In a number of cases, in order to avoid subjecting the photoconductor to the action of illumination which renders the image visible and to separate the photoconductor from the medium that renders the image visible, which permits a wider selection of a photoconductor and media, and increasing the sensitivity of the conductor, in all the described embodiments of the method according to the invention, a layer of anisotropic conducting medium is provided between the photoconductor and the medium which renders the image visible under the action of current and charges, that is, the electrolyte, the gas-saturated liquid, the liquid in the state of near-boiling, a saturated or supersaturated vapour, and the anistropic conducting medium bordering on the one side with the photoconductor and on the other side with said medium which renders the image visible under the action of current and charges.

In certain cases, having a layer of anisotropic conductivity it is not necessary to remove voltage from the photoconductor, thus rendering the image frames visible by alternating the cycles of bringing out the image, and removing the phase nuclei that render the image visible.

Another embodiment of the method according to the present invention is possible, wherein, using a medium which renders the image visible under the action of current and charges, namely a saturated or supersaturated vapour, an additional pulsed electric field is provided to draw the charges from the surface of the photoconductor, or from the surface of the layer of anisotropic conducting medium to the medium that renders the image visible under the action of current and voltage, namely an electrolyte, a gas-saturated liquid, a liquid that is in the state of near-boiling, and a saturated or supersaturated vapour.

The drawing of the charges from the surface facilitates the separation of light diffused on the nuclei generated on the charges from the light diffused on the surface undulations.

EXAMPLES OF THE PREFERRED EMBODIMENT

The invention is further illustrated by way of specific embodiments thereof.

Example 1

The method or producing a visible image wherein a photoconductor, which in the embodiment described is a silicon photoconductor, is irradiated by a luminous flux which carries an image, and causes the appearance of current and charges in the photoconductor and the electrolyte, which in the embodiment described is a 10 weight percent aqueous solution of sulfuric acid, wherein the photoconductor is placed. The potential difference between the latter and the other electrode, which in this case is a carbon electrode, is from 1 to 10 V, with the photoconductor having negative polarity. The current pulse duration is from 0.1 to 30 microseconds. The density of the luminous flux carrying the primary image is 0.1 mW/cm$^2$.

With current flowing through sulfuric acid, vapour-gas phase nuclei are formed on the surface of the photoconductor within a period of time on the order of hundredths of a second, as a result of the electrolysis, with the vapour-gas phase nuclei in the form of gas bubbles being formed and concentrated at areas corresponding to the areas of greater luminous radiation, and higher current density of the photoconductor, since the amount of evolved gas is proportional to the number of charges that passed through the photoconductor. Such bubble distribution reproduces the secondary image which becomes visible when the nuclei are illuminated, since the greater the number of bubbles, and the larger, the greater is the local diffusion of the light that renders the image visible.

In accordance with the above-described embodiment of the method, an image was produced comprised of gas bubbles, with the gas bubble diameter being from 1 to 5 microns at current duration of about from 0.1 to 30 microseconds, with the average distance between bubbles being from 3 to 20 microns (depending on the intensity of irradiation), and with the time for the gas bubbles growth corresponding to the duration of current pulses.

Example 2

A visible image was produced by the procedure employed in Example 1, with the difference being that a 0.1 weight percent aqueous solution of sulfuric acid was used in this case.

The average diameter of bubbles was ten times smaller than that of the bubbles obtained in Example 1.

Example 3

A visible image was produced by the procedure employed in Example 1, however, in this case an aqueous solution of about 100 percent sulfuric acid was used.

Due to the poor dissociation, the image produced had poorer parameters than those of the image produced in Example 1.

Example 4

A visible image was produced by the procedure employed in Example 1, which in this case, however, a 10 weight percent aqueous solution of hydrochloric acid was used. The image produced had parameters similar to those of the image produced in Example 1.

Example 5

A visible image was produced by the procedure employed in Example 1, which in this case, however, a 0.1 weight percent aqueous solution of hydrochloric acid was used. The results obtained were similar to those of Example 2.

Example 6

A visible image was produced by the procedure employed in Example 1, with the difference being that in this case an aqueous solution of about 100 weight percent of hydrochloric acid was used. The results obtained were similar to those obtained in Example 3.

Example 7

A visible image was produced by the procedure employed in Example 1, however, in this case a 10 weight percent aqueous solution of sodium hydroxide was used. The results obtained were similar to those obtained in Example 1.

Example 8

A visible image was produced by the procedure employed in Example 7, with the difference being that a 0.1 weight percent solution of sodium hydroxide was used as the electrolyte. The results obtained were similar to those obtained in Example 2.

Example 9

A visible image was produced by the procedure employed in Example 7, with the difference being that the concentration of sodium hydroxide was about 100 weight percent. The results obtained were similar to those obtained in Example 3.

Example 10

A visible image was produced by the procedure employed in Example 7, with the difference being that a 10 weight percent solution of potassium hydroxide was used as the electrolyte. The results obtained were similar to those obtained in Example 1.

Example 11

A visible image was produced by the procedure employed in Example 10, with the difference being that the concentration of potassium hydroxide was 0.1 weight percent. The results obtained were similar to those obtained in Example 2.

Example 12

A visible image was produced by the procedure employed in Example 10, with the difference being that the concentration of potassium hydroxide was about 100 weight percent. The results obtained were similar to those obtained in Example 3.

Example 13

A method for producing a visible image by means of a photoconductor and a medium rendering the image visible, which is similar to the method as described in Example 1, but with an aqueous solution of sulfuric acid saturated with carbon dioxide, which increased the size of bubbles forming on the surface of the photoconductor to about from 1 to 2 mm. The solution was saturated with the gas at a pressure which exceeded the atmospheric pressure by scores of percent. After being saturated with the gas, the sulfuric acid was kept at a normal atmospheric pressure.

Example 14

A visible image was produced by the method described in Example 13, but with an aqueous solution of sodium hydroxide saturated with carbon dioxide. The values of resistance of the photoconductor and the liquid were selected to be such that local heating of the photoconductor, or the liquid would lead to decreased solubility of the gas, and a local metastable condition. In this case the bubbles were formed, not because of the electrolytic gas elution, but as a result of the liquid being heated by the current through the photoconductor and the liquid. In this case the level of gasification was higher at of 1 atm. The parameters of the image produced were the same as that of the image obtained in Example 13.

Example 15

A visible image was produced by the procedure of Example 13, with the difference being that a liquid being near the state of boiling was used, namely water at a normal temperature and reduced pressure, which was $10^{-1}$ to $10^{-2}$ atm. The parameters of the image obtained were similar to those of the image produced in Example 13.

Example 16

A visible image was produced by the procedure employed in Example 15, but water was used at atmospheric pressure and an elevated temperature that approached its boiling point of about 100°C. The results obtained were similar to those of Example 15, but the quality of the image was impaired due to convection, since the heating of water was continued even directly before the image was registered.

Example 17

A method for producing a visible image wherein the medium rendering the image visible is a saturated, or supersaturated gas in the form of alcohol vapour in air.

In this case phase condensed nuclei - droplets of condensed liquid are formed, which reproduce a secondary image which is visible when illuminated by a luminous flux. Supersaturation was produced when the volume of vapour expanded by 1% of the initial volume, and then a rapid increase of formed droplets was observed.

When the volume was further increased to 30%, microdroplet formation were observed on individual ions, with the rate of droplet growth being $5.10^{-6}$ cm/sec.

The parameters of the image produced were similar to those of the image produced in Example 1.

Example 18

A visible image was produced by the procedure employed in Example 17, however, the medium rendering the image visible was a mixture of alcohol vapour and argon. Image formation was observed to take place at smaller expansions than in Example 17.

The parameters of the image obtained were similar to those of the image in Example 17.

Example 19

The images produced in Examples 1 through 18 have the following parameters: the dimensions of phase nuclei are from fractions of a micron to several microns.

In order to increase the brightness of the image, produced according to Examples 1 through 18, the phase nuclei reproducing the image are grown by means of creating metastable conditions in the medium which under the action of current and charges, renders the image visible, such as an electrolyte, a gas-saturated liquid, or a liquid in the state of near-boiling, in saturated or supersaturated vapors. These conditions ensure spontaneous growth of nuclei.

The metastable conditions are created by reducing the pressure from the initial value to a pressure which is less than the pressure of gas or vapour inside the bubble by a value which is greater than the pressure of surface tension $P=2 b/r$, wherein b is surface tension, and r is the radius of the gas-vapour nuclei. Or in the case of nuclei of condensed phase - pressure reduction, where the medium temperature is reduced to a temperature at which the pressure of the saturated vapors is less.

An image was produced by the above-described embodiment of with the method, the image comprising bubbles, and droplets having dimensions tens and hundreds of times greater than those in examples 1 through 18.

Example 20

In order to increase the size of bubbles in example 15 and their dispersion, the pressure is reduced from one atm. to 0.3 atm., resulting in the size of the bubbles increasing three-fold.

Example 21

In order to facilitate the growth of bubbles according to Example 16, the pressure was reduced from one atm. to 0.3 atm. Rapid growth of bubbles to the size of about one mm was observed.

Example 22

The image reproducing the phase nuclei produced according to Examples 1 through 12 (19) are removed by the operations described above, thus ensuring the possibility of reproducing images that change with time.

The phase nuclei are removed by increasing the pressure to a value a number of times exceeding the initial value, which ensures the bursting and dissolution of vapour-gas nuclei.

Thereafter the whole process described in Examples 1 to 12 (19-21) is repeated which permits the same image to be reproduced again (provided the initial image has not changed), or another frame of an image that is changing with time.

Example 23

The image reproducing phase nuclei produced according to Examples 13 and 14 (19) are removed similarly to Example 22. However, in this case the pressure does not exceed 1 to 3 atm.

Example 24

The image reproducing phase nuclei produced according to Examples 15 and 16 (19–(19–21) are removed similarly to Example 22. In this case, however, the pressure increase does not exceed from 3 to 10 atm. The value of pressure increasing, and the process of nuclei removal is accelerated.

Example 25

The image reproducing phase nuclei produced according to that of Examples 17 and 18 (19–21) are removed similarly to Example 22. The pressure in this case is exactly 10 atm.

Example 26

The image reproducing phase nuclei produced according to Examples 1 through 18 (19-21) are removed by shaking, which permits the pressure to remain unchanged and large pressure differentials to be avoided.

Example 27

The image reproducing phase nuclei produced according to Examples 1 through 18 (19-21) are removed by scraping, which also avoids the use of pressure, and creats large pressure differentials.

Example 28

The image reproducing phase nuclei produced according to Examples 17 and 18 (19-21) are removed by heating. The photoconductor is heated from its initial temperature to a temperature that approaches the temperature of rapid evaporation of the droplets. This permits the next image frame to be produced to be sufficiently clear.

Example 29

All operations are similar to the operations of Example 28, but in this case the nuclei are heated to the temperature of rapid evaporation by illuminating the nuclei with the light in the example describing the use of light, at which the image becomes visible.

Example 30

In order to improve the quality of image produced according to Examples 1 through 29, voltage is removed from the photoconductor when the image is illuminated.

Example 31

When producing an image according to Examples 1 through 30, a layer of anisotropic medium is provided between the photoconductor and the medium which renders the image visible under the action of current and charges, with said anisotropic layer bordering on the one side with the photoconductor, and on the other side with said medium, which renders the image visible under the action of current and voltage.

Such an embodiment for the method according to the invention permits a sharp increase in the range of combinations of photoconductors and media, which render the image visible, use sensitive photoconductors, avoid the need of preventing exposure of the photoconductor, and the need to relieve voltage.

Example 32

When producing an image according to Examples 17 and 18 (19-21), an additional pulse electric field is created having about 30 kV/cm intensity, 30 microsec. duration, and drawing the charges formed on the photoconductor to the saturated and supersaturated vapour.

The conductivity of the photoconductor in this case plays the role of charge supplyer, but is also conducive for the creation of strong marginal fields in the regions of maximum illumination and conduction.

Example 33

In producing an image according to Example 31, an additional pulse electric field is created according to Example 32.

The method of producing a visible image in accordance with the present invention features high sensitivity and resolution, which are determined by the small size of the bubbles (the size thereof may be in the range of fractions of a micron).

What is claimed is:

1. A method for producing a visible image comprising:
   a. disposing a photoconductor in an image producing medium said medium selected from the group consisting of:
      1. electrolyte solutions, said electrolyte solutions selected from the group consisting of aqueous solutions of inorganic acids, alkali hydroxides, alkali metal salts and mixtures of inorganic acids and alkali metal salts;
      2. liquids having a gas dissolved therein under pressure, said liquids being selected from the group consisting of electrolyte solutions as defined in (1), alcohols, propane and fluorocarbons, and said gas being selected from the group consisting of gases which are neutral relative to the electrolyte solution in which it is dissolved, nitrogen, oxygen and inert gases;
      3. liquids approaching the conditions of boiling, said liquids being selected from the group consisting of water, alcohols, ether and liquified gases;
      4. saturated and supersaturated mixtures of vapors in gases, said vapors being selected from the group consisting of alcohol and ether vapors, and said gases being selected from air and the inert gases;
   b. applying an electric potential across said photoconductor;
   c. subjecting said photoconductor and medium to image carrying radiation whereupon current and charges are formed therein and bubbles are generated in said liquid media and droplets are generated in said vapor media in response to the passage of current and charges in direct proximity to the surface of said photoconductor, said bubbles and droplets being concentrated in areas corresponding to the areas of greater irradiation of said photoconductor to thereby produce the image.

2. The method for producing a visible image as claimed in claim 1, wherein said image producing bubbles and droplets are grown by providing conditions in said image producing medium which favor volumetric expansion of said bubbles and droplets.

3. The method for producing a visible image as claimed in claim 2, wherein said conditions are achieved by reducing pressure in said image producing medium.

4. The method for producing a visible image as claimed in claim 2, wherein said conditions are achieved by reducing the temperature of said image producing medium.

5. The method for producing a visible image as claimed in claim 2, wherein said conditions are achieved by creating a temperature gradient in said image producing medium.

6. The method for producing a visible image as claimed in claim 1, wherein said electric potential across said photoconductor is removed when said image is illuminated.

7. The method for producing a visible image as claimed in claim 1, wherein a layer of anisotropic conducting medium is interposed between said photoconductor and said image producing medium, said anisotropic conducting medium being bordered on one side by said photoconductor, and on its other side by said image producing medium.

8. The method for producing a visible image as claimed in claim 1, wherein said image producing bubbles and droplets are removed to ensure the possibility of reproducing images that change with time.

9. The method for producing a visible image as claimed in claim 8, wherein said bubbles and droplets are removed by means of increasing the pressure to a value which ensures the bursting and dissolution of said bubbles, and the evaporation of said droplets.

10. The method for producing a visible image as claimed in claim 8, wherein said bubbles and droplets are removed by shaking.

11. The method for producing a visible image as claimed in claim 8, wherein said bubbles are removed from said electrolyte solutions, liquids having a gas dissolved therein and liquids approaching the condition of boiling by scraping.

12. The method for producing a visible image as claimed in claim 8, wherein said droplets are removed by heating.

13. The method for producing a visible image as claimed in claim 5, wherein said image producing bubbles and droplets are removed to ensure the possibility of reproducing images that change with time.

14. The method for producing a visible image as claimed in claim 13, wherein said bubbles and droplets are removed by increasing the pressure to a value which ensures the bursting and dissolution of said bubbles, and the evaporation of said droplets.

15. The method for producing a visible image as claimed in claim 13, wherein said bubbles and droplets are removed by shaking.

16. The method for producing a visible image as claimed in claim 13, wherein said bubbles are removed from said electrolyte solutions, liquids having a gas dissolved therein and liquids approaching the conditions of boiling by scraping.

17. The method for producing a visible image as claimed in claim 13, wherein said droplets are removed by heating.

* * * * *